H. G. HOGAN.
PACKING FOR PISTONS AND VALVE STEMS.
APPLICATION FILED APR. 8, 1915.

1,162,062.

Patented Nov. 30, 1915.

WITNESSES:

INVENTOR
HENRY G. HOGAN
BY
ATTORNEY

UNITED STATES PATENT OFFICE.

HENRY G. HOGAN, OF INDIANAPOLIS, INDIANA.

PACKING FOR PISTONS AND VALVE-STEMS.

1,162,062.  Specification of Letters Patent.  Patented Nov. 30, 1915.

Application filed April 8, 1915. Serial No. 19,875.

*To all whom it may concern:*

Be it known that I, HENRY G. HOGAN, a citizen of the United States, and a resident of Indianapolis, county of Marion, and State of Indiana, have invented a certain new and useful Packing for Pistons and Valve-Stems; and I do hereby declare that the following is a full, clear, and exact description thereof, reference being had to the accompanying drawings, in which like letters refer to like parts.

The object of this invention is to maintain automatically perfect packing for valve stems, shafts and the like during the wear of the packing from the time the packing is inserted until worn out.

The chief feature of the invention consists in utilizing two packing rings which together form a spherically disposed convex surface with a straight line of division between said rings inclined at an angle to a transverse plane through the rod, and a clamping member having a spherically-disposed concave surface engaged by all of the surface of one packing ring and a portion of the surface of the other packing ring, and a spring tending to press said packing rings and clamping member together at all times.

The full nature of the invention will be understood from the accompanying drawings and the following description and claims.

Figure 1:
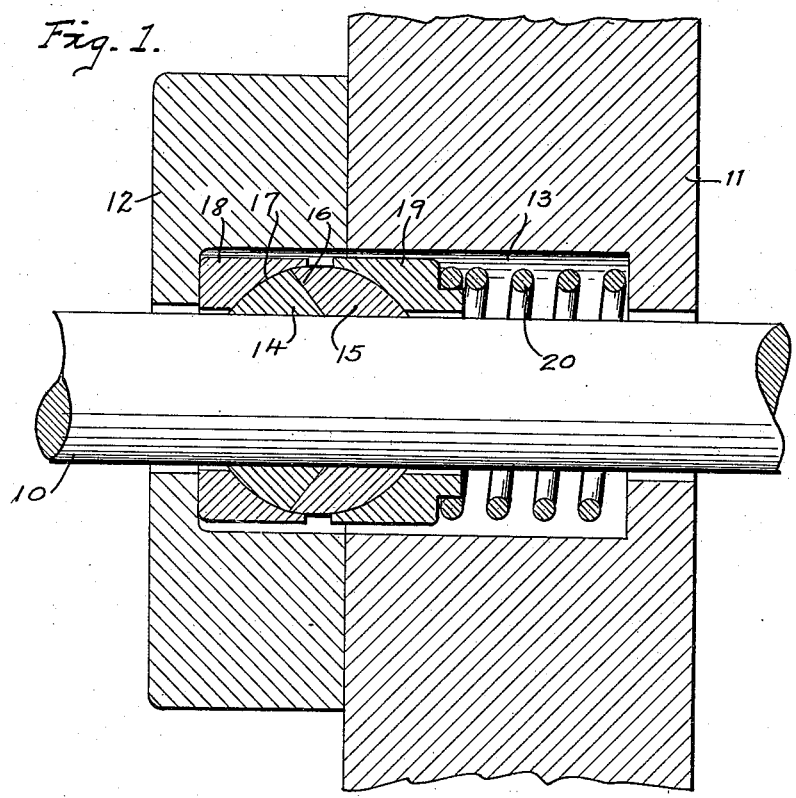
Figure 2:
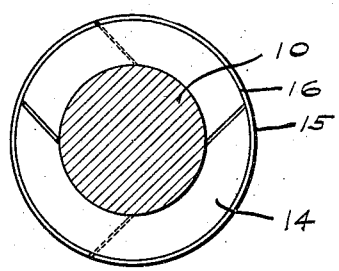

In the drawings, Figure 1 is a central longitudinal section through the device. Fig. 2 is a transverse section through the piston or valve stem and showing the packing rings in elevation.

In the drawing there is shown a piston or valve rod 10 operating in a stuffing box composed of a stationary member 11 and a follower or associated member 12 formed so as to fit together and inclose chamber 13 surrounding the piston or valve rod 10. Within said chamber there are two packing rings 14 and 15 which surround the piston or valve rod 10 and have a spherical outer surface. The packing ring 14 has its greatest cross sectional area less than the greatest cross sectional area of the packing ring 15 by reason of the dividing plane 16 between them being inclined to the axis of the rod 10. Said rings engage the inner spherically concave surface 17 of a clamping member 18 which surrounds the piston or valve rod 10 and lies against one end of the chamber 13 and against the follower 12. A substantially similar but oppositely-disposed member 19 engages the surface at the opposite end of the ring 15 and a spiral spring 20 surrounds the valve rod or piston stem and lies in said chamber with one end thereof bearing against a portion of the stuffing box 11 and the other end pressing said member 19 against the piston rings and thus pressing said piston rings against said member 18. It is immaterial whether the small piston ring 14 is adjacent the clamping member 18 or the member 19, so long as one of said members 18 or 19 overlaps the division 16 between the piston rings so that under the spring pressure such overlapping member will hold and force said piston rings against each other and will continue to do so until the rings are worn out. The packing rings 14 and 15 are each in section, as shown in Fig. 2, and the ends of the sections are inclined so as to be substantially tangential to the piston or valve stem and in the beginning there is some space between the adjacent ends of the ring sections so as to allow for wear. The clamping members 18 and 19 are of less diameter than the chamber 13 so that the construction accommodates itself to the vibration of the rod 10 and without any interference on the part of the stuffing box.

The invention claimed is:

1. The combination with a stuffing box, and a rod movable in said stuffing box, of a pair of packing rings surrounding said rod and having a spherical external surface with engaging surfaces between them inclined to the axis of the rod, a clamping member in said chamber and surrounding said rod and having an inner spherical concave surface engaging the external spherical surface of said rings and overlapping the division line between them, and spring means for forcing said packing rings and clamping member against said packing rings.

2. The combination with a stuffing box having a closed chamber therein, and a rod movable in said stuffing box, of a pair of packing rings within said chamber and surrounding said rod and having a spherical external surface and with straight engaging surfaces between them inclined to the axis of the rod, a pair of clamping members surrounding said rod, one on each side of said packing rings and each clamping member having an inner spherical concave surface engaging the external spherical surface of said packing rings, and one of said clamping members being against the end of said chamber and overlapping the line of division between said packing rings, and spring means acting against the other end of said chamber for forcing said clamping members against said packing rings.

In witness whereof, I have hereunto affixed my signature in the presence of the witnesses herein named.

HENRY G. HOGAN.

Witnesses:
J. H. WELLS,
R. G. LOCKWOOD.

Copies of this patent may be obtained for five cents each, by addressing the "Commissioner of Patents, Washington, D. C."